United States Patent
Zhu

(10) Patent No.: US 10,984,653 B1
(45) Date of Patent: Apr. 20, 2021

(54) VEHICLE, FLEET MANAGEMENT AND TRAFFIC LIGHT INTERACTION ARCHITECTURE DESIGN VIA V2X

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 16/839,646

(22) Filed: Apr. 3, 2020

(51) Int. Cl.
| | | |
|---|---|---|
| *G08G 1/08* | (2006.01) | |
| *G08G 1/095* | (2006.01) | |
| *H04W 4/40* | (2018.01) | |
| *G08G 1/01* | (2006.01) | |

(52) U.S. Cl.
CPC .............. *G08G 1/08* (2013.01); *G08G 1/0116* (2013.01); *G08G 1/0141* (2013.01); *G08G 1/0145* (2013.01); *G08G 1/095* (2013.01); *H04W 4/40* (2018.02)

(58) Field of Classification Search
CPC .... G08G 1/09626; G08G 1/167; G08G 1/082; G08G 1/087; B60W 30/12; G06K 9/00791; G06K 9/00825; H04W 4/44
See application file for complete search history.

(56) References Cited

U.S. PATENT DOCUMENTS

| | | | | |
|---|---|---|---|---|
| 2012/0271540 | A1* | 10/2012 | Miksa | B60W 30/12 |
| | | | | 701/409 |
| 2016/0163193 | A1* | 6/2016 | Cross | G08G 1/087 |
| | | | | 340/907 |
| 2017/0032670 | A1* | 2/2017 | Poornachandran | |
| | | | | G08G 1/096775 |
| 2018/0096597 | A1* | 4/2018 | Mortazavi | H04W 4/023 |
| 2020/0005632 | A1* | 1/2020 | Chen | G08G 1/052 |
| 2020/0047771 | A1* | 2/2020 | Yoon | B60W 60/001 |

* cited by examiner

*Primary Examiner* — Mirza F Alam
(74) *Attorney, Agent, or Firm* — Womble Bond Dickinson (US) LLP

(57) ABSTRACT

In one embodiment, a method of controlling traffic lights in a V2X environment includes the operations of receiving, at a cloud server, status information of a number of vehicles; and filtering out one or more vehicles that are not to encounter a traffic light on their routes in a predetermined distance ahead of the vehicles. The method further includes obtaining a punctuality status of each remaining vehicle according to a schedule table; and optimizing each traffic light in the V2X environment based on the punctuality status of the vehicle to obtain a traffic light optimization result. The cloud server can send the traffic light optimization result to a vehicle closest to each traffic light. The vehicle that receives the traffic light optimization result can relay the result to the traffic light that is closest to the vehicle.

20 Claims, 6 Drawing Sheets

VEHICLE, FLEET MANAGEMENT AND TRAFFIC LIGHT INTERACTION ARCHITECTURE DESIGN VIA V2X

TECHNICAL FIELD

Embodiments of the present disclosure relate generally to vehicle to a vehicle-to-everything (V2X) system. More particularly, embodiments of the disclosure relate to methods of interaction among vehicles, a cloud sever and traffic lights in a V2X environment.

BACKGROUND

V2X is a technology that allows vehicles to communicate with each other and with other moving parts of a traffic system. A V2X system can be used to send traffic light information to vehicles, and to send vehicle status information to a traffic light controller so that the V2X system can give a vehicle a green light when the vehicle is a high-priority vehicle.

There are many existing implementations of a V2X systems. However, the effectiveness and efficiency of these implementations need to be improved in terms of controlling traffic lights in the V2X environment.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
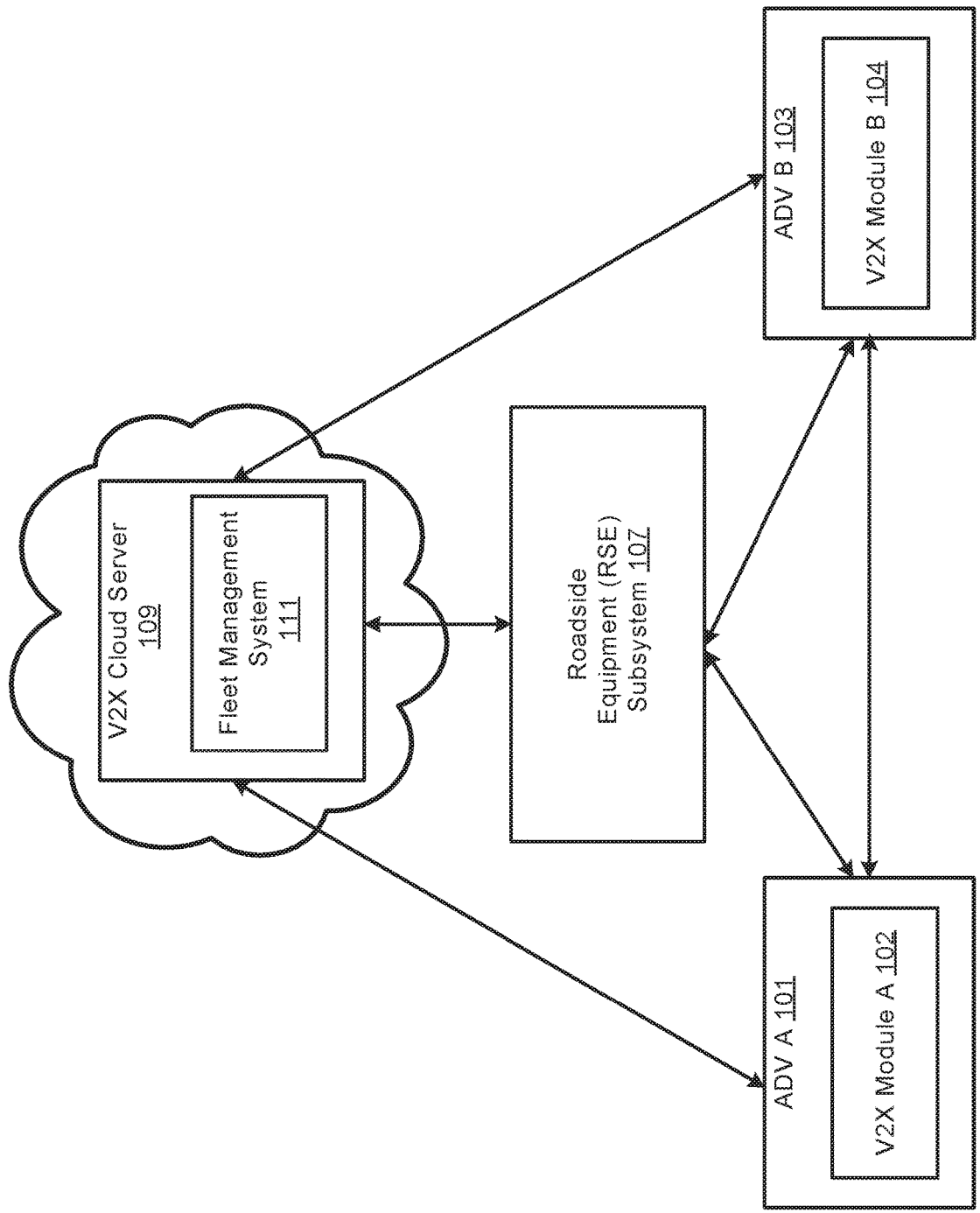
FIG. 1 is a block diagram illustrating a V2X environment according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, described herein are methods and systems for effective control of traffic lights using a vehicle schedule table in a V2X environment. In one embodiment, a method of controlling traffic lights in a V2X environment includes the operations of receiving, at a cloud server, status information of a number of vehicles; and filtering out one or more vehicles that are not to encounter a traffic light on their routes in a predetermined distance ahead of the vehicles. The method further includes obtaining a punctuality status of each remaining vehicle according to a schedule table; and optimizing each traffic light in the V2X environment based on the punctuality status of the vehicle to obtain a traffic light optimization result. The cloud server can send the traffic light optimization result to a vehicle closest to each traffic light. The vehicle that receives the traffic light optimization result can relay the result to the traffic light that is closest to the vehicle.

In one embodiment, the traffic light optimization result can include one or more optional requests for a green light and one or more mandatory request for a green light.

In one embodiment, to obtain the punctuality status of each of the remaining vehicles (i.e., vehicles that are not filtered out), the cloud server needs to perform the following operations: calculating an estimated time of arrival (ETA) to a next traffic light for the vehicle; calculating an estimated time needed to pass through an area corresponding to the next traffic light; and determining, based on the schedule table, the ETA and the estimated time needed to pass through the area, whether the vehicle is on schedule, behind schedule, or before schedule. If the vehicle is behind schedule or before schedule, the cloud server also needs to calculate how far the vehicle is behind schedule or before schedule based on the schedule table.

In one embodiment, in optimizing the traffic lights in the V2X environment, the cloud server is to minimize an overall waiting time and an overall schedule delay time for each of the remaining vehicles, and prioritize one or more vehicles that are already delayed.

In one embodiment, each vehicle in the V2X environment can be an autonomous driving vehicles that includes a V2X module for communicating with the cloud server, one or more other autonomous driving vehicles, and a roadside equipment subsystem of a V2X system.

Embodiments of the invention can be used to provide more effective control of traffic lights in the V2X environment, since it utilizes a schedule time and has the status information of each vehicle in the V2X environment when scheduling the traffic lights.

The above summary does not include an exhaustive list of all aspects of the present invention. It is contemplated that the invention includes all systems, computer media, and methods that can be practiced from all suitable combinations of the various aspects summarized above, and also those disclosed below.

FIG. 1 is a block diagram illustrating a V2X environment according to one embodiment. V2X technology enables vehicles to communicate with other vehicles, with roadside infrastructure, with wireless networks, and with pedestrians.

As shown in FIG. 1, a V2X environment can include a V2X cloud server 109, a number of vehicles 101 and 103, and a roadside equipment subsystem 107. In the V2X environment, communication is enabled between the vehicles 101 and 103, between each vehicle and the cloud server 109, and between the cloud server 109 and the roadside equipment subsystem 107.

In one embodiment, the roadside equipment subsystem 107 can include roadside units such as traffic lights, toll gates, sensors, and various wireless equipment that broadcast signals. Although the figure shows that each of the vehicles 101 and 103 can be autonomous driving vehicles with modules for communicating with the roadside infrastructure 107 and the cloud server 109., non-autonomous driving vehicles with similar modules installed thereon would also work in the V2X environment.

In one embodiment, the vehicles 101 and 103 and the roadside equipment subsystem 107 can be placed in a closed area, for example, a park or a mining area. The cloud server 109 can include a fleet management system 111 to collect information from each vehicle operating in the closed area and various sensors of the roadside equipment subsystem 107. The communication between the vehicles 101 and 103, and among each vehicle, the roadside equipment subsystem 107 and the cloud server 109 can be enabled via wireless technology, such as 4G, 5G or 6G technology.

The V2X environment can be used in a wide range of scenarios, including in accident prevention and safety, convenience, traffic efficiency, and clean driving. For example, the V2X environment can prevent accident by alerting drivers of hidden dangers that cannot be sensed by traditional on-board equipment such as sensors. Further, the V2X environment can facilitate optimized traffic routing, increased traffic flow, and traffic control, thereby improving mobility, productivity and convenience.

In one embodiment, the fleet management system 111 can determine the punctuality status of one or more vehicles based on their status information and a schedule table, and use the punctuality statuses of the vehicles to optimize the traffic lights to achieve overall efficiency in the V2X environment.

Figure 2:
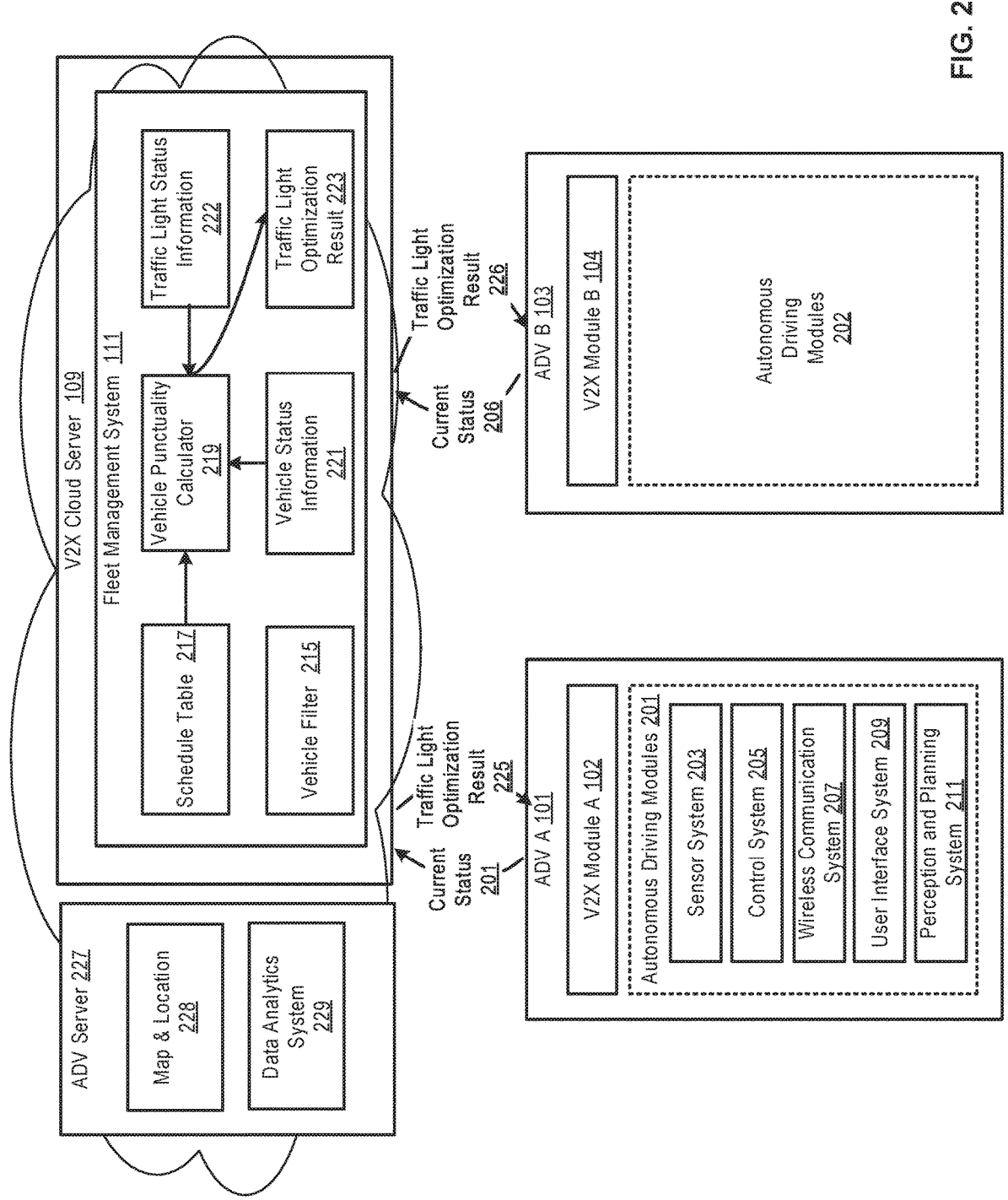
FIG. 2 is a block diagram further illustrating the V2X environment according to one embodiment.

FIG. 2 is a block diagram further illustrating the V2X environment according to one embodiment. As described above, each vehicle in the V2X environment can be an autonomous driving vehicle or a non-autonomous driving vehicle. In the embodiment illustrated in FIG. 2, both the vehicles 101 and 103 are autonomous driving vehicles with a number of software modules installed thereon.

By way of example, the vehicle 101 can be communicatively coupled to one or more servers 109 and 227 and coupled to each other over a network. The network can be any type of networks such as a local area network (LAN), a wide area network (WAN) such as the Internet, a cellular network, a satellite network, or a combination thereof, wired or wireless. Servers 109 and 227 may be any kind of servers or a cluster of servers, such as Web or cloud servers, application servers, backend servers, or a combination thereof.

In one embodiment, in addition to the V2X module 102, the vehicle 101 can include a number of autonomous driving modules 201. The autonomous driving modules can include a perception and planning system 211, a vehicle control system 205, a wireless communication system 207, a user interface system 209, and a sensor system 203. The vehicle 101 may further include certain common components included in ordinary vehicles, such as, an engine, wheels, steering wheel, transmission, etc., which may be controlled by the vehicle control system 205 and/or the perception and planning system 211 using a variety of communication signals and/or commands, such as, for example, acceleration signals or commands, deceleration signals or commands, steering signals or commands, braking signals or commands, etc.

Some or all of the functions of autonomous driving vehicle 101 may be controlled or managed by perception and planning system 211, especially when operating in an autonomous driving mode. Perception and planning system 211 includes the necessary hardware (e.g., processor(s), memory, storage) and software (e.g., operating system, planning and routing programs) to receive information from sensor system 203, control system 205, wireless communication system 207, and/or user interface system 209, process the received information, plan a route or path from a starting point to a destination point, and then drive vehicle 101 based on the planning and control information. Alternatively, perception and planning system 211 may be integrated with vehicle control system 205.

For example, a user as a passenger may specify a starting location and a destination of a trip, for example, via a user interface. Perception and planning system 211 obtains the trip related data. For example, perception and planning system 211 may obtain location and route information from an MPOI server. The location server provides location services and the MPOI server provides map services and the POIs of certain locations. Alternatively, such location and MPOI information may be cached locally in a persistent storage device of perception and planning system 211

While autonomous driving vehicle 101 is moving along the route, perception and planning system 211 may also obtain real-time traffic information from a traffic information system or server (TIS). Note that the servers may be operated by a third party entity. Alternatively, the functionalities of the servers may be integrated with perception and planning system 211. Based on the real-time traffic information, MPOI information, and location information, as well as real-time local environment data detected or sensed by sensor system 203 (e.g., obstacles, objects, nearby vehicles), perception and planning system 211 can plan an optimal route and drive vehicle 101, for example, via control system 205, according to the planned route to reach the specified destination safely and efficiently.

The autonomous driving modules 201 and the V2X module 102 may be communicatively coupled to each other via an interconnect, a bus, a network, or a combination thereof. For example, they may be communicatively coupled to each other via a controller area network (CAN) bus. A CAN bus is a vehicle bus standard designed to allow microcontroller and devices to communicate with each other in applications without a host computer. It is a message-based protocol, designed originally for multiplex electrical wiring within automobiles, but is also used in many other contexts. The vehicle 103 would include the same set of autonomous driving modules 202 as the vehicle 101.

The server 227 can include map and location information 228 for the vehicle 101 to generate locations and plan routes. The server 227 can also include a data analytics system 229 to perform data analytics services for a variety of clients. In one embodiment, data analytics system 229 includes a data collector and a machine learning engine. The data collector collects driving statistics from a variety of vehicles, either autonomous vehicles or regular vehicles driven by human drivers. The driving statistics include information indicating the driving commands (e.g., throttle, brake, steering commands) issued and responses of the vehicles (e.g., speeds, accelerations, decelerations, directions) captured by sensors of the vehicles at different points in time. The driving statistics may further include information describing the driving environments at different points in time, such as, for example, routes (including starting and destination locations), MPOIs, road conditions, weather conditions, etc. Based on the driving statistics, the machine learning engine generates or trains a set of rules, algorithms, and/or predictive models for a variety of purposes.

In one embodiment, the fleet management system 111 can collect status information of each vehicle in the V2X environment and traffic light information, and use the collection information and a schedule table 217 to more efficiently and effectively control the traffic lights so that vehicles with a higher priority can pass through a green light first. Thus, all the vehicles in the V2X environment as a fleet can be more effectively regulated and controlled.

In one embodiment, each vehicle operating in the V2X environment, for example, the vehicle 101 and the vehicle 103, can send its status information 201 and 206 to the fleet management system 111 via a wireless network (e.g., 4G/5G). The status information may include the current position and the current route of the vehicle. The status information 221 enables the fleet management system to be aware of the current position of each vehicle in the V2X environment at any particular time.

With the status information of each vehicle in the V2X environment, the fleet management system 111 can invoke a vehicle filter 215 to filter out one or more vehicles based on certain conditions. For example, the fleet management system may filter out a vehicle that is not to encounter a traffic light within the next 200 meters on its current route. When the vehicle is filtered out, the fleet management system would not consider that vehicle in regulating and controlling the traffic lights.

In one embodiment, for each vehicle that is not filtered out, the fleet management system 111 can calculate the estimated time of arrival to a next traffic light on its current route, and an estimated time needed to pass through an area corresponding to the next traffic light. The fleet management system 111 maintains information for the corresponding area to each traffic light in a closed area. In this embodiment, both the vehicle 101 and the vehicle 103 are not filtered out.

With the schedule information for each vehicle in the schedule table 217, and the estimated time of arrival as well the estimated time needed to pass through the corresponding area of the next traffic light, a vehicle punctuality calculator 219 can determine the punctuality status of each vehicle, including whether the vehicle is on schedule, behind schedule, or before schedule; and that if the vehicle is behind schedule or before schedule, how far the vehicle is behind schedule or before schedule based on the schedule table 217.

With the punctuality status determined for each vehicle that is not filtered out, the vehicle punctuality calculator 219 can obtain status information of each traffic light 222 in the V2X environment, and perform one or more optimizing operations to optimize the traffic lights in view of the vehicle punctuality status.

To optimize the traffic lights, the fleet management system 111 focuses on all the vehicles in the V2X environment. The optimization process is to minimize each vehicle's overall waiting time and overall schedule delay time. For a vehicle that is before schedule, the fleet management system 111 may control the traffic light to allow the vehicle to wait a little longer since doing so would not increase the vehicle's overall waiting time. On the other hand, keeping a delayed vehicle waiting would increase the delay time of the vehicle. Therefore, those vehicles that are already delayed would be given a higher priority to get a green light.

The optimization process can generate a traffic light optimization result 223, which can be sent 225 and 226 respectively to a vehicle that is closest to each traffic light. In this embodiment, each of the vehicle 101 and the vehicle 103 is the vehicle that is the closest to a traffic light. Although not shown in the figure, the traffic light optimization result 223 is to be sent to one or more other vehicles, each of which is the closest to a traffic light.

Figure 3:
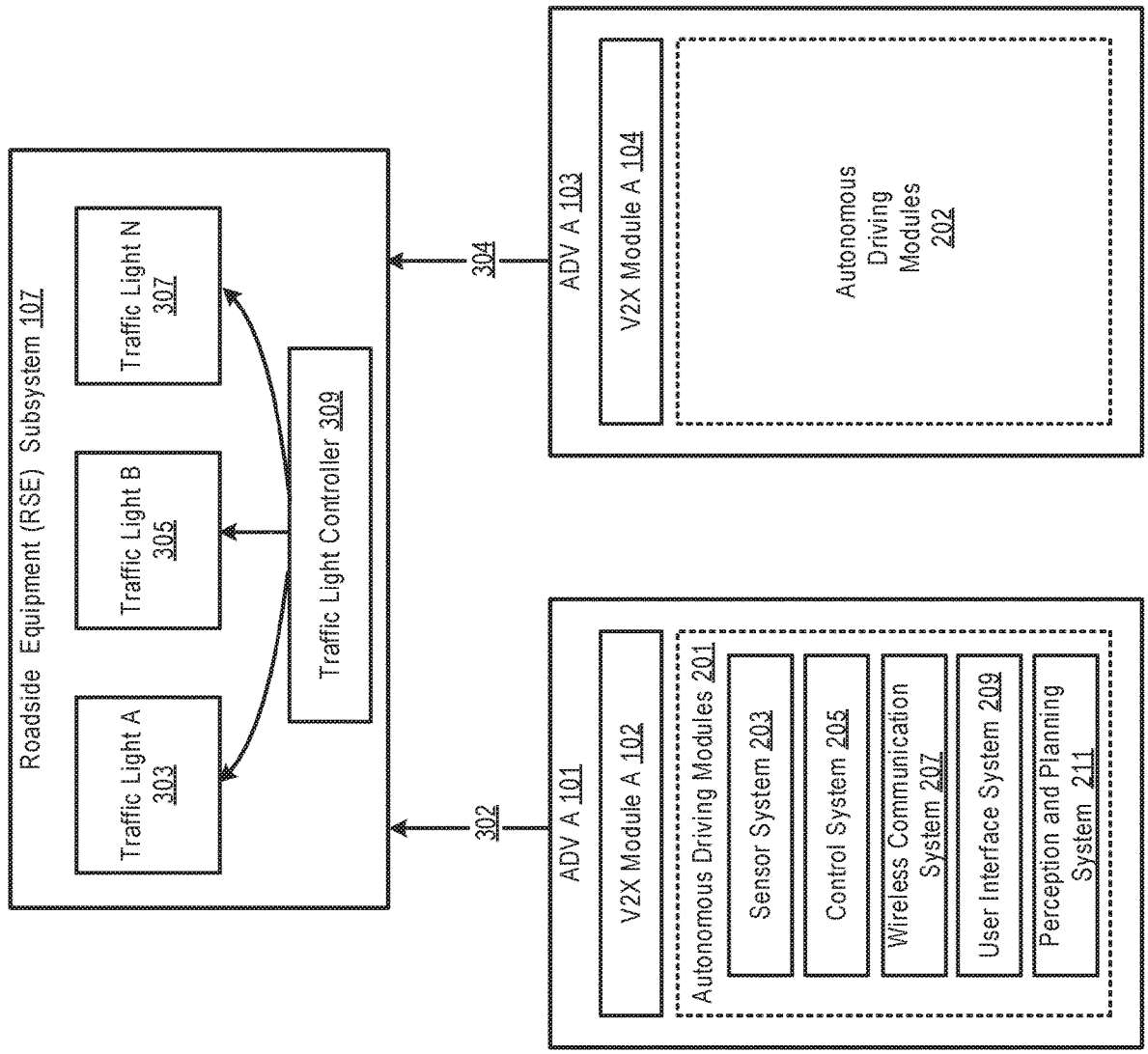
FIG. 3 is a block diagram further illustrating the V2X environment according to one embodiment.

FIG. 3 is a block diagram further illustrating the V2X environment according to one embodiment. As shown in FIG. 3, the roadside equipment subsystem 107 can include a traffic light controller 309 that controls a number of traffic lights 303, 305, and 307. Although only three traffic lights are shown in the figure, there may be many more traffic lights at different intersections and that are controlled by the traffic light controller 309 in the closed area.

After each vehicle that is closest to a traffic light receives the traffic light optimization result 223 as described in FIG. 2, that vehicle can relay the received traffic light optimization result 223 to the closest traffic light.

By way of example, the vehicle 101 is the vehicle that is the closest to the traffic light 303, and the vehicle 103 is the vehicle that is the closest to the traffic light 307. Accordingly, the vehicle 101 and the vehicle 103 would relay 302 and 304 the traffic light optimization result respectively to the traffic light 303 and the traffic light 307.

In one embodiment, any vehicle that is the closest to a traffic light in the closed area would receive the same traffic light optimization result 223. The vehicle would send the same traffic light optimization result 223 to the traffic light closest to the vehicle.

In one embodiment, the traffic light optimization result 223 can include requests for a green light. Each such request can be mandatory or optional. A request may not necessarily benefit the vehicle that sends the request. Therefore, a request for a green light sent by the vehicle 101 may not be a request for a green light for the vehicle 101. Rather, the requests are just to relay information from the cloud server 107 to the corresponding traffic light. The traffic light optimization result 22 are to benefit all the vehicles in the V2X environment, and are optimized to control the traffic lights and route the vehicles so as to reduce the overall efficiency and effectiveness of all the vehicles as a fleet.

Figure 4:
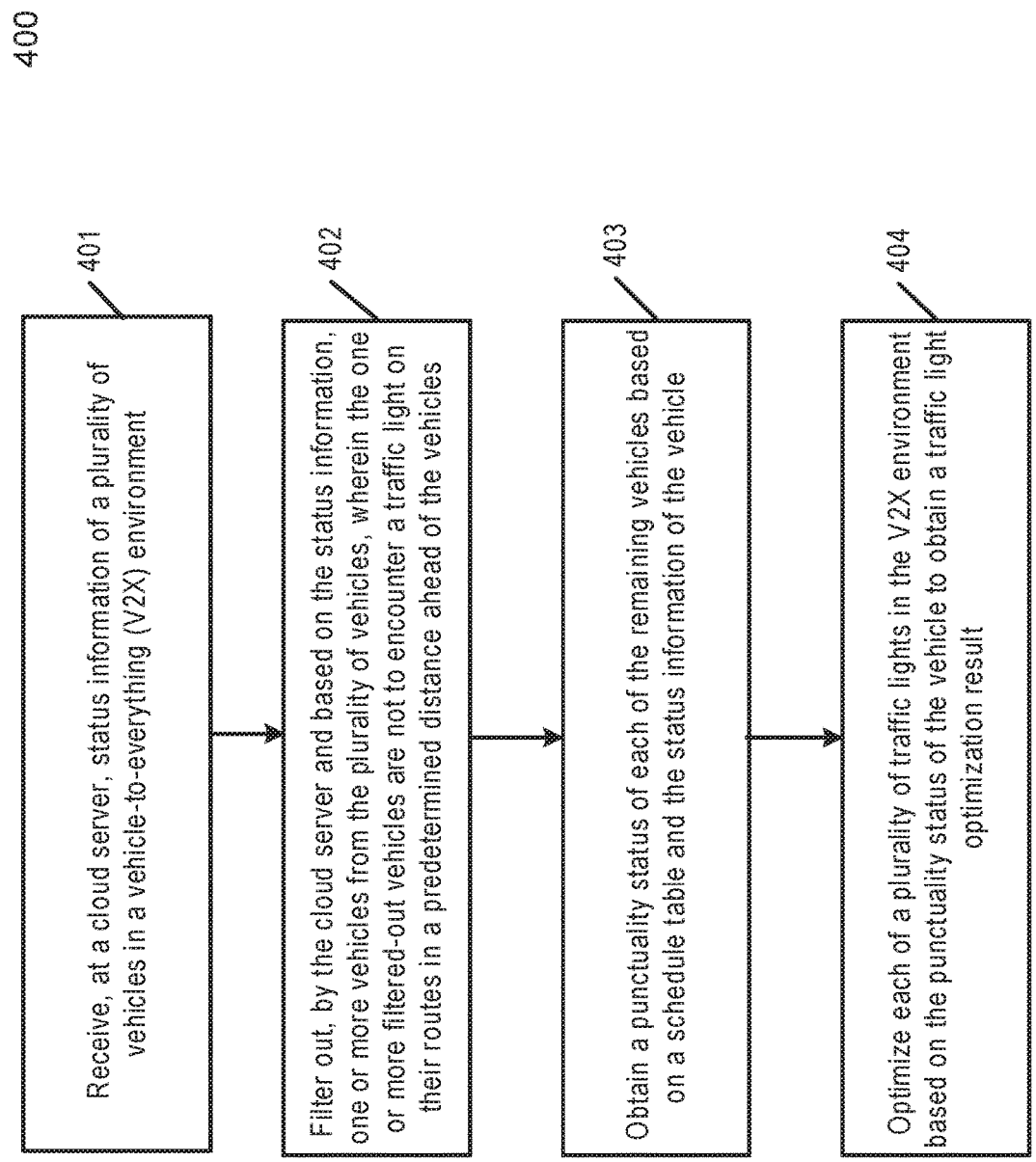
FIG. 4 is an example process 400 of controlling traffic lights in a V2X environment according to one embodiment.

FIG. 4 is an example process 400 of controlling traffic lights in a V2X environment according to one embodiment. Process 400 may be performed by processing logic which may include software, hardware, or a combination thereof. For example, process 400 may be performed by the fleet management system 111 described in FIG. 2 and FIG. 3.

Referring to FIG. 4, in operation 401, a cloud server in a V2X environment collects status information of each vehicle operating in the V2X environment. The status information includes the current position and the current route of the vehicle.

In operation 402, the cloud server filters out those vehicles that are not to encounter a traffic light in a predetermined distance on the current routes based on the collected status information of the vehicles.

In operation 403, for those remaining vehicles that have not been filtered out, the cloud server obtains a punctuality status for each vehicle based on a schedule table and the status information. The punctuality status includes whether the vehicle is on schedule, behind schedule or before schedule according to the schedule table. If the vehicle is behind schedule or before schedule, the cloud server is to determine how far the vehicle is behind schedule or before schedule.

In operation 404, the cloud server optimizes each traffic light in the V2X environment based on the punctuality status of the vehicle to obtain a traffic light optimization result. The optimization process is to improve the overall efficiency of all vehicles in the V2X environment by minimizing each vehicle's overall waiting time and overall schedule delay time. For example, for a vehicle that is before schedule, the cloud server may control the traffic light to allow the vehicle to wait a little longer since doing so would not increase the vehicle's overall waiting time.

Figure 5:
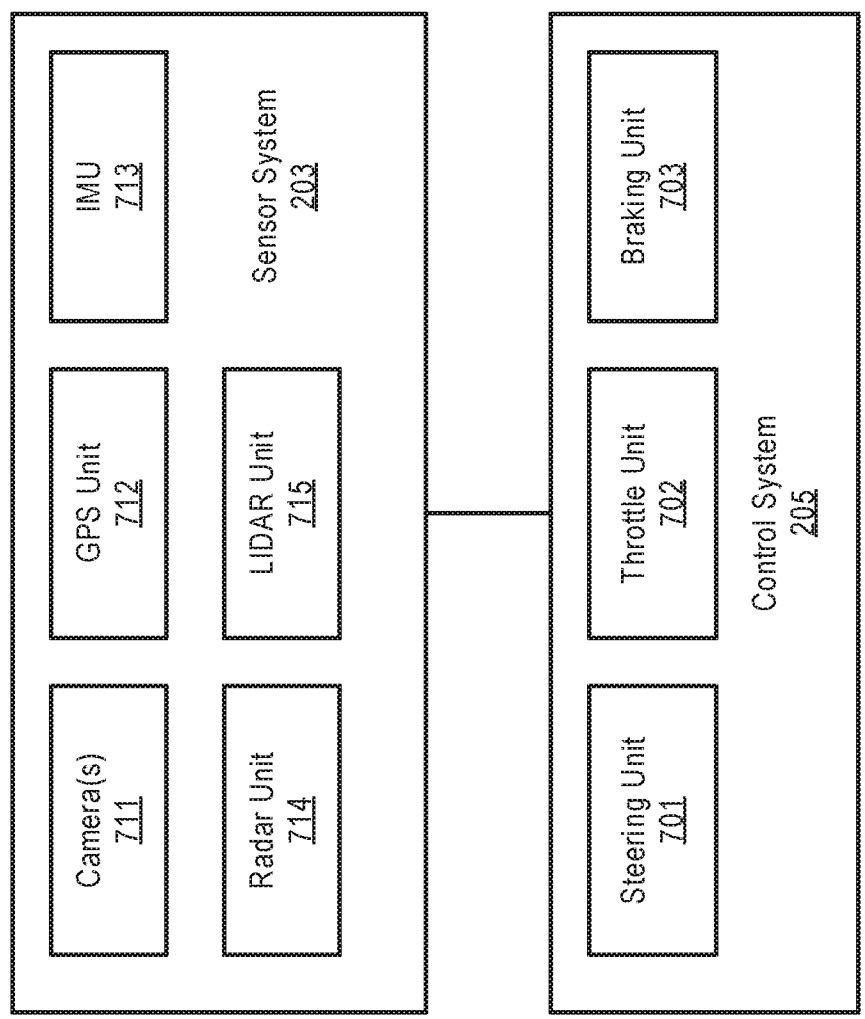
FIG. 5 is a block diagram illustrating an example of an autonomous driving vehicle according to one embodiment.

FIG. 5 is a block diagram illustrating an example of an autonomous driving vehicle according to one embodiment. In FIG. 5, in one embodiment, sensor system 203 includes, but it is not limited to, one or more cameras 711, global positioning system (GPS) unit 712, inertial measurement unit (IMU) 713, radar unit 714, and a light detection and range (LIDAR) unit 715. GPS system 712 may include a transceiver operable to provide information regarding the position of the autonomous driving vehicle. IMU unit 713 may sense position and orientation changes of the autonomous driving vehicle based on inertial acceleration. Radar unit 714 may represent a system that utilizes radio signals to sense objects within the local environment of the autonomous driving vehicle. In some embodiments, in addition to sensing objects, radar unit 714 may additionally sense the speed and/or heading of the objects. LIDAR unit 715 may sense objects in the environment in which the autonomous driving vehicle is located using lasers. LIDAR unit 715 could include one or more laser sources, a laser scanner, and one or more detectors, among other system components. Cameras 711 may include one or more devices to capture images of the environment surrounding the autonomous driving vehicle. Cameras 711 may be still cameras and/or video cameras. A camera may be mechanically movable, for example, by mounting the camera on a rotating and/or tilting a platform.

Sensor system 203 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous driving vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 205 includes, but is not limited to, steering unit 701, throttle unit 702 (also referred to as an acceleration unit), and braking unit 703. Steering unit 701 is to adjust the direction or heading of the vehicle. Throttle unit 702 is to control the speed of the motor or engine that in turn controls the speed and acceleration of the vehicle. Braking unit 703 is to decelerate the vehicle by providing friction to slow the wheels or tires of the vehicle. Note that the components as shown in FIG. 7 may be implemented in hardware, software, or a combination thereof.

Figure 6:
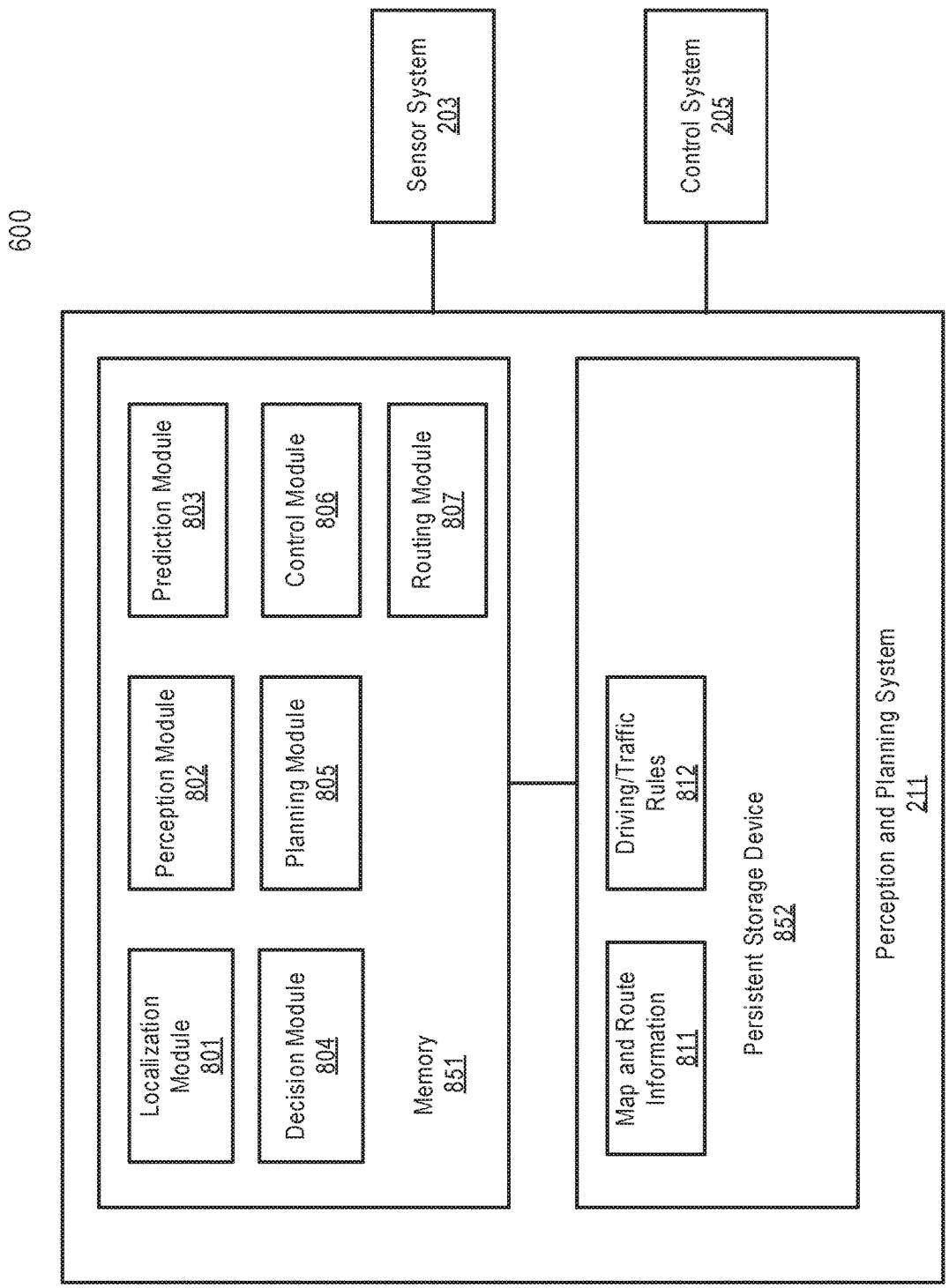
FIG. 6 is a block diagram illustrating an example of a perception and planning system used with an autonomous driving vehicle according to one embodiment.

FIG. 6 is a block diagram illustrating an example of a perception and planning system used with an autonomous driving vehicle according to one embodiment. System 600 may be implemented as a part of autonomous driving vehicle 101 of FIG. 2.

Perception and planning system 211 includes, but is not limited to, localization module 801, perception module 802, prediction module 803, decision module 804, planning module 805, control module 806, and routing module 807.

Some or all of modules 801-807 may be implemented in software, hardware, or a combination thereof. For example, these modules may be installed in persistent storage device 852, loaded into memory 851, and executed by one or more processors (not shown). Some of modules 801-807 may be integrated together as an integrated module.

Localization module 801 determines a current location of autonomous driving vehicle 101 (e.g., leveraging GPS unit 712) and manages any data related to a trip or route of a user. Localization module 801 (also referred to as a map and route module) manages any data related to a trip or route of a user. A user may log in and specify a starting location and a destination of a trip, for example, via a user interface. Localization module 801 communicates with other components of autonomous driving vehicle 101, such as map and route information 811, to obtain the trip related data. For example, localization module 801 may obtain location and route information from a location server and a map and POI (MPOI) server. A location server provides location services and an MPOI server provides map services and the POIs of certain locations, which may be cached as part of map and route information 811. While autonomous driving vehicle 101 is moving along the route, localization module 801 may also obtain real-time traffic information from a traffic information system or server.

Based on the sensor data provided by sensor system 203 and localization information obtained by localization module 801, a perception of the surrounding environment is determined by perception module 802. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 802 may include a computer vision system or functionalities of a computer vision system to process and analyze images captured by one or more cameras in order to identify objects and/or features in the environment of autonomous driving vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 802 can also detect objects based on other sensors data provided by other sensors such as a radar and/or LIDAR.

For each of the objects, prediction module 803 predicts what the object will behave under the circumstances. The prediction is performed based on the perception data perceiving the driving environment at the point in time in view of a set of map/rout information 811 and traffic rules 812. For example, if the object is a vehicle at an opposing direction and the current driving environment includes an intersection, prediction module 803 will predict whether the vehicle will likely move straight forward or make a turn. If the perception data indicates that the intersection has no traffic light, prediction module 803 may predict that the vehicle may have to fully stop prior to enter the intersection. If the perception data indicates that the vehicle is currently at a left-turn only lane or a right-turn only lane, prediction module 803 may predict that the vehicle will more likely make a left turn or right turn respectively.

For each of the objects, decision module 804 makes a decision regarding how to handle the object. For example, for a particular object (e.g., another vehicle in a crossing route) as well as its metadata describing the object (e.g., a speed, direction, turning angle), decision module 804 decides how to encounter the object (e.g., overtake, yield, stop, pass). Decision module 804 may make such decisions according to a set of rules such as traffic rules or driving rules 812, which may be stored in persistent storage device 852.

Routing module 807 is configured to provide one or more routes or paths from a starting point to a destination point. For a given trip from a start location to a destination location, for example, received from a user, routing module 807 obtains route and map information 811 and determines all possible routes or paths from the starting location to reach the destination location. Routing module 807 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 804 and/or planning module 805. Decision module 804 and/or planning module 805 examine all of the possible routes to select and modify one of the most optimal routes in view of other data provided by other modules such as traffic conditions from localization module 801, driving environment perceived by perception module 802, and traffic condition predicted by prediction module 803. The actual path or route for controlling the ADV may be close to or different from the reference line provided by routing module 807 dependent upon the specific driving environment at the point in time.

Based on a decision for each of the objects perceived, planning module 805 plans a path or route for the autonomous driving vehicle, as well as driving parameters (e.g., distance, speed, and/or turning angle), using a reference line provided by routing module 807 as a basis. That is, for a given object, decision module 804 decides what to do with the object, while planning module 805 determines how to do it. For example, for a given object, decision module 804 may decide to pass the object, while planning module 805 may determine whether to pass on the left side or right side of the object. Planning and control data is generated by planning module 805 including information describing how vehicle 101 would move in a next moving cycle (e.g., next route/path segment). For example, the planning and control data may instruct vehicle 101 to move 10 meters at a speed of 30 mile per hour (mph), then change to a right lane at the speed of 25 mph.

Based on the planning and control data, control module 806 controls and drives the autonomous driving vehicle, by sending proper commands or signals to vehicle control system 205, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 805 plans a next route segment or path segment, for example, including a target position and the time required for the ADV to reach the target position. Alternatively, planning module 805 may further specify the specific speed, direction, and/or steering angle, etc. In one embodiment, planning module 805 plans a route segment or path segment for the next predetermined period of time such as 5 seconds. For each planning cycle, planning module 805 plans a target position for the current cycle (e.g., next 5 seconds) based on a target position planned in a previous cycle. Control module 806 then generates one or more control commands (e.g., throttle, brake, steering control commands) based on the planning and control data of the current cycle.

Note that decision module 804 and planning module 805 may be integrated as an integrated module. Decision module 804/planning module 805 may include a navigation system or functionalities of a navigation system to determine a driving path for the autonomous driving vehicle. For example, the navigation system may determine a series of speeds and directional headings to affect movement of the autonomous driving vehicle along a path that substantially avoids perceived obstacles while generally advancing the autonomous driving vehicle along a roadway-based path leading to an ultimate destination. The destination may be set according to user inputs via user interface system 209. The navigation system may update the driving path dynamically while the autonomous driving vehicle is in operation. The navigation system can incorporate data from a GPS system and one or more maps so as to determine the driving path for the autonomous driving vehicle.

According to one embodiment, a system architecture of an autonomous driving system as described above includes, but it is not limited to, an application layer, a planning and control (PNC) layer, a perception layer, a device driver layer, a firmware layer, and a hardware layer. The application layer may include user interface or configuration application that interacts with users or passengers of an autonomous driving vehicle, such as, for example, functionalities associated with user interface system 209. The PNC layer may include functionalities of at least planning module 805 and control module 806. The perception layer may include functionalities of at least perception module 802. In one embodiment, there is an additional layer including the functionalities of prediction module 803 and/or decision module 804. Alternatively, such functionalities may be included in the PNC layer and/or the perception layer. The firmware layer may represent at least the functionality of sensor system 203, which may be implemented in a form of a field programmable gate array (FPGA). The hardware layer may represent the hardware of the autonomous driving vehicle such as control system 205. The application layer, PNC layer, and perception layer can communicate with the firmware layer and hardware layer via the device driver layer.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of controlling traffic lights in a vehicle-to-everything (V2X) environment, comprising:
   receiving, at a cloud server, status information of a plurality of vehicles in the V2X environment;
   filtering out, by the cloud server and based on the status information, one or more vehicles from the plurality of vehicles, wherein the one or more filtered-out vehicles are not to encounter a traffic light on their routes in a predetermined distance ahead of the vehicles;
   obtaining a punctuality status of each of the remaining vehicles based on a schedule table and the status information of the vehicle, including
   determining, based on the schedule table, an estimated time of arrival and an estimated time needed to pass through an area, whether the vehicle is on schedule, behind schedule, or before schedule, and
   in response to determining that the vehicle is behind schedule or before schedule, calculating how far the vehicle is behind schedule or before schedule based on the schedule table;
   optimizing each of a plurality of traffic lights in the V2X environment based on the punctuality status of the vehicle to obtain a traffic light optimization result; and
   sending, by the cloud server, the traffic light optimization result to at least one remaining vehicle for the at least one remaining vehicle to relay the received traffic light optimization result to the traffic light.

2. The computer-implemented method of claim 1, further comprising:
   sending, by the cloud server, the traffic light optimization result to a vehicle closest to each of the plurality of traffic lights.

3. The computer-implemented method of claim 2, wherein the vehicle relays the traffic light optimization result to the traffic light that is closest to the vehicle.

4. The computer-implemented method of claim 3, wherein the traffic light optimization result includes one of an optional request for a green light or a mandatory request for a green light.

5. The computer-implemented method of claim 1, wherein
   obtaining the punctuality status of each of the remaining vehicles of the plurality of vehicles further comprises:
   calculating the estimated time of arrival (ETA) to a next traffic light for the vehicle;
   calculating the estimated time needed to pass through the area corresponding to the next traffic light.

6. The computer-implemented method of claim 1, wherein each of the traffic lights is optimized to
   minimize an overall waiting time for each of the remaining vehicles of the plurality of vehicles;
   minimize an overall schedule delay time for each of the remaining vehicle;
   prioritize one or more vehicles that are already delayed.

7. The computer-implemented method of claim 1, wherein each of the plurality of vehicles is an autonomous driving vehicles that includes a V2X module for communicating with the cloud server, one or more other autonomous driving vehicles, and a roadside equipment subsystem of a V2X system.

8. The computer-implemented method of claim 1, wherein the status information for each vehicle includes a current position of the vehicle and a current route of the vehicle.

9. A non-transitory machine-readable medium having instructions stored therein, which when executed by a processor, cause the processor to perform operations, the operations comprising:
   receiving, at a cloud server, status information of a plurality of vehicles in a vehicle-to-everything (V2X) environment;

filtering out, by the cloud server and based on the status information, one or more vehicles from the plurality of vehicles, wherein the one or more filtered-out vehicles are not to encounter a traffic light on their routes in a predetermined distance ahead of the vehicles;

obtaining a punctuality status of each of the remaining vehicles based on a schedule table and the status information of the vehicle, including determining, based on the schedule table, an estimated time of arrival and an estimated time needed to pass through an area, whether the vehicle is on schedule, behind schedule, or before schedule, and in response to determining that the vehicle is behind schedule or before schedule, calculating how far the vehicle is behind schedule or before schedule based on the schedule table;

optimizing each of a plurality of traffic lights in the V2X environment based on the punctuality status of the vehicle to obtain a traffic light optimization result; and sending, by the cloud server, the traffic light optimization result to at least one remaining vehicle for the at least one remaining vehicle to relay the received traffic light optimization result to the traffic light.

10. The non-transitory machine-readable medium of claim 9, wherein the operations further comprises:
sending, by the cloud server, the traffic light optimization result to a vehicle closest to each of the plurality of traffic lights.

11. The non-transitory machine-readable medium of claim 10, wherein the vehicle relays the traffic light optimization result to the traffic light that is closest to the vehicle.

12. The non-transitory machine-readable medium of claim 11, wherein the traffic light optimization result includes one of an optional request for a green light or a mandatory request for a green light.

13. The non-transitory machine-readable medium of claim 9, wherein obtaining the punctuality status of each of the remaining vehicles of the plurality of vehicles further comprises:
calculating the estimated time of arrival (ETA) to a next traffic light for the vehicle;
calculating the estimated time needed to pass through the area corresponding to the next traffic light.

14. The non-transitory machine-readable medium of claim 9, wherein each of the traffic lights is optimized to minimize an overall waiting time for each of the remaining vehicles of the plurality of vehicles;
minimize an overall schedule delay time for each of the remaining vehicle;
prioritize one or more vehicles that are already delayed.

15. The non-transitory machine-readable medium of claim 9, each of the plurality of vehicles is an autonomous driving vehicles that includes a V2X module for communicating with the cloud server, one or more other autonomous driving vehicles, and a roadside equipment subsystem of a V2X system.

16. The non-transitory machine-readable medium of claim 9, wherein the status information for each vehicle includes a current position of the vehicle and a current route of the vehicle.

17. A data processing system, comprising:
a processor; and
a memory coupled to the processor to store instructions, which when executed by the processor, cause the processor to perform operations, the operations including receiving, at a cloud server, status information of a plurality of vehicles in a vehicle-to-everything (V2X) environment, filtering out, by the cloud server and based on the status information, one or more vehicles from the plurality of vehicles, wherein the one or more filtered-out vehicles are not to encounter a traffic light on their routes in a predetermined distance ahead of the vehicles, obtaining a punctuality status of each of the remaining vehicles based on a schedule table and the status information of the vehicle, including determining, based on the schedule table, an estimated time of arrival and an estimated time needed to pass through an area, whether the vehicle is on schedule, behind schedule, or before schedule, and in response to determining that the vehicle is behind schedule or before schedule, calculating how far the vehicle is behind schedule or before schedule based on the schedule table, optimizing each of a plurality of traffic lights in the V2X environment based on the punctuality status of the vehicle to obtain a traffic light optimization result, and sending, by the cloud server, the traffic light optimization result to at least one remaining vehicle for the at least one remaining vehicle to relay the received traffic light optimization result to the traffic light.

18. The data processing system of claim 17, wherein the operations further comprises:
sending, by the cloud server, the traffic light optimization result to a vehicle closest to each of the plurality of traffic lights.

19. The data processing system of claim 18, wherein the vehicle relays the traffic light optimization result to the traffic light that is closest to the vehicle.

20. The data processing system of claim 19, wherein the traffic light optimization result includes one of an optional request for a green light or a mandatory request for a green light.

* * * * *